United States Patent
Bronzini

[15] 3,673,898
[45] July 4, 1972

[54] HORIZONTAL LATHE WITH OVERHEAD BRIDGE

[72] Inventor: Bruno Bronzini, Turin, Italy
[73] Assignee: Fratelli Morando & C.S.p.A., Turin, Italy
[22] Filed: June 26, 1970
[21] Appl. No.: 50,160

[30] Foreign Application Priority Data

Feb. 21, 1970 Italy..................................67580 A/70

[52] U.S. Cl......................................................82/2.5, 82/3
[51] Int. Cl..........................................................B23b 15/00
[58] Field of Search ......................................82/3, 2.5, 2.7, 2

[56] References Cited

UNITED STATES PATENTS

| | | | |
|---|---|---|---|
| 3,423,812 | 1/1969 | Spur | 29/38 |
| 2,534,993 | 12/1950 | Robichaud | 82/3 X |
| 3,400,618 | 9/1968 | Steinmetz | 82/2.5 |

*Primary Examiner*—Leonidas Vlachos
*Attorney*—Young & Thompson

[57] ABSTRACT

A horizontal lathe has an overhead bridge on each side of which a machine tool slide is disposed, the space below the workpiece being free. A conveyor for workpieces can be arranged in this free space.

2 Claims, 2 Drawing Figures

PATENTED JUL 4 1972

3,673,898

INVENTOR

BRUNO BRONZINI

By Young & Thompson

ATTYS.

HORIZONTAL LATHE WITH OVERHEAD BRIDGE

The present invention relates to horizontal lathes of the type that have one or more horizontal spindles for rotating workpieces about horizontal axes.

It is an object of the present invention to provide such a lathe which permits easy supply and removal of workpieces.

Another object of the present invention is the provision of such a lathe from which turnings can be readily discharged.

Finally, it is an object of the present invention to provide such a lathe which will be relatively simple and inexpensive to manufacture, easy to operate, maintain and repair, and rugged and durable in use.

Briefly, the objects of the present invention are achieved by providing a horizontal lathe having an overhead bridge with downwardly extending machine tool slides mounted on either side of the bridge, the space below the workpiece being free. A conveyor for supplying workpieces to and removing workpieces from the lathe can be disposed in this free space.

Figure 1:
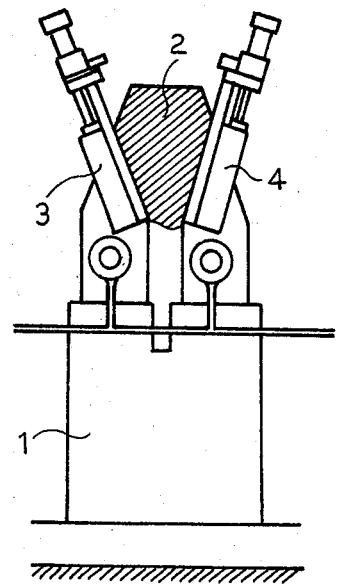
Figure 2:
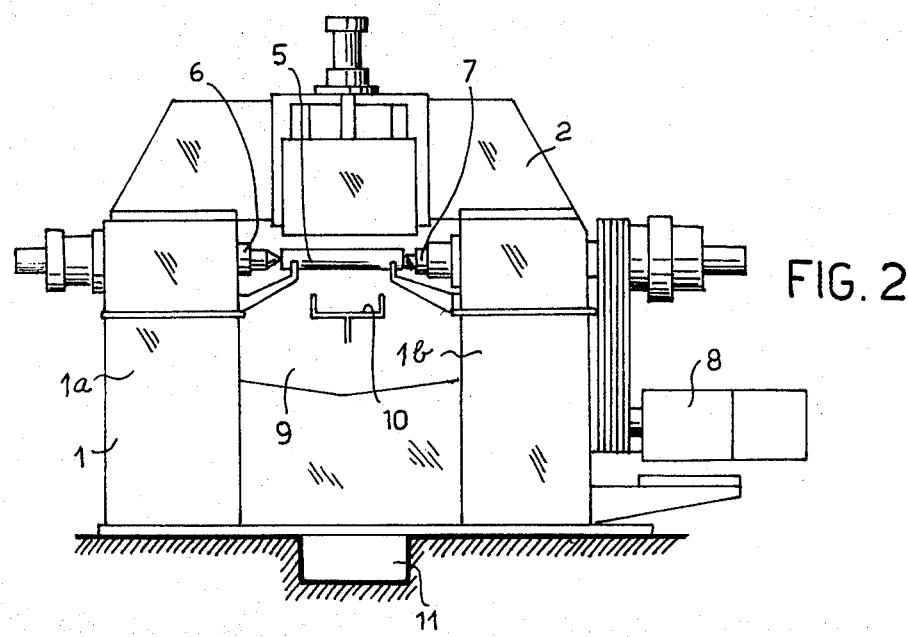

These and other objects, features and advantages of the present invention will become apparent from a consideration of the following description, taken in connection with the accompanying drawing, in which:

FIG. 1 is an end elevational view of a lathe according to the present invention, with a part thereof in cross section; and FIG. 2 is a side elevational view of the lathe of FIG. 1.

Referring now to the drawing in greater detail, there is shown a lathe having a frame indicated at 1, comprising a pair of pillars 1a and 1b that are spaced apart lengthwise of the axis of rotation of the lathe. A cross rail or bridge 2 is secured at its ends to the tops of the pillars 1a and 1b and bridges across over the space between the pillars.

Power-operated vertically reciprocable metalworking machine tool slides 3 and 4 are carried by bridge 2 one on either side thereof, for operating on metal workpieces 5 below the bridge. A centering member 6 carried by pillar 1a supports one end of workpiece 5 while a spindle 7 coaxial with centering member 6 and mounted for rotation in pillar 1b supports the other end of workpiece 5. A motor 8 drives spindle 7 in the usual way to rotate workpiece 5. It will of course be understood that there can be one assembly of members 6, 7, 8 or a plurality of such assemblies for simultaneously acting on workpieces that are parallel to each other. The tools 3 and 4 are advanced and retracted and otherwise moved by conventional power means indicated only diagrammatically in the drawing.

As best seen in FIG. 2, the space 9 below the workpieces 5 is open and free and permits the provision of an automatic workpiece loading and unloading device 10 therein, for advancing workpieces into space 9, positioning them for reception and retention by the members 6, 7, and then for removing the workpieces on which the work operation has been completed. Device 10 can be conventional in nature and accordingly need not be described in greater detail. A trough 11 recessed in the floor catches the turnings and permits their easy removal. The open space 9 facilitates the discharge of these turnings.

From a consideration of the foregoing disclosure, therefore, it will be evident that all of the initially recited objects of the present invention have been achieved.

Although the present invention has been described and illustrated in connection with a preferred embodiment, it is apparent that modifications and variations may be resorted to without departing from the spirit of this invention, as those skilled in this art will readily understand. Such modifications and variations are considered to be within the purview and scope of the present invention as defined by the appended claims.

Having described my invention, I claim

1. A horizontal lathe comprising a frame, said frame comprising a pair of spaced upright pillars, an overhead bridge supported on and extending between the upper ends of said pillars, means for retaining and rotating about a horizontal axis a workpiece disposed beneath the bridge, said means comprising a pair of spindles rotatable about a common horizontal axis, one of said spindles being mounted on and extending horizontally from one said pillar below said bridge toward the other said pillar, the other spindle being mounted on and extending horizontally from said other pillar below the bridge toward said one spindle, a pair of machine tool slides mounted one on either side of the bridge for acting on workpieces carried between said spindles, and workpiece feed and discharge means disposed below said spindles in the space between the pillars for feeding workpieces to and removing workpieces from the space between said spindles.

2. A horizontal lathe as claimed in claim 1, said pillars being supported on a floor, and a trough recessed in the floor below said space between said pillars for catching and removing turnings from said workpiece.

* * * * *